United States Patent [19]
Ballard

[11] Patent Number: 4,470,696
[45] Date of Patent: Sep. 11, 1984

[54] LASER DOPPLER VELOCIMETER
[75] Inventor: Paul T. Ballard, Kettering, Ohio
[73] Assignee: Systems Research Laboratories, Inc., Dayton, Ohio
[21] Appl. No.: 311,216
[22] Filed: Oct. 14, 1981
[51] Int. Cl.³ .............................................. G01P 3/36
[52] U.S. Cl. ...................... 356/28.5; 356/28
[58] Field of Search ................................ 356/28.5, 28

[56] References Cited
U.S. PATENT DOCUMENTS

| | | | |
|---|---|---|---|
| 3,419,330 | 12/1968 | Schneider | 356/28.5 |
| 3,432,237 | 3/1969 | Flower et al. | 356/28.5 |
| 3,604,804 | 9/1971 | Penney et al. | 356/28.5 |
| 3,915,572 | 10/1975 | Orloff | 356/28.5 |
| 4,168,906 | 9/1979 | Schwiesow | 356/28.5 |

FOREIGN PATENT DOCUMENTS

| | | | |
|---|---|---|---|
| 2506593 | 8/1976 | Fed. Rep. of Germany | 356/28.5 |
| 97469 | 8/1979 | Japan | 356/28.5 |

OTHER PUBLICATIONS

G. Stavis, TNB, vol. 8, #4, 1965 by GPL Div. of General Precision Inc.
"Laser Doppler Velocimeter" Brochure, Cambridge Physical Science, Survey & General Instr. Co. Ltd., Faircroft Way, Edenbridge, Kent, U.K.
W. J. Yanta et al., Agard Conf. Proc. #193 on Applications of Non-Intrusive Instr. in Fluid Flow Research, France (May 3-5 '76).
A. V. Vasil'ev et al., Sov. J. Quantum Electron, vol. 10, #11, Nov. 1980, p. 1466.
L. E. Drain, Laser Focus, 10-1980, pp. 68-73.
R. A. Flower, IEEE Conf. Record of 1969 4th Annual Meet. of IEEE Industry & General Applications Group, Oct. 10-16, 1969, pp. 307-314.

Primary Examiner—S. C. Buczinski
Attorney, Agent, or Firm—Biebel, French & Nauman

[57] ABSTRACT

Reflections, having positive and negative Doppler frequency shifts, from a laser beam directed at a moving surface are passed through spatial filters, combined by a beam splitter, and focussed on an observation plane of a photodetector to provide a fringe pattern having an amplitude variation frequency responsive to the velocity of the moving surface. The laser beam may be a single beam directed substantially perpendicularly to the moving surface, or the laser beam may be divided into two beams angled toward the surface, one beam impinging with the direction of motion of the surface and the other beam impinging against the direction of motion. When two impinging beams, split from a common beam, are utilized, different polarizations and beam impingement points on the surface may be used to provide beam isolation between the beam signals. Homodyne detection with single frequency lasers is used. With multi-mode lasers emitting two separate frequencies of radiation, heterodyne detection may be used to provide better resolution at low surface velocities.

22 Claims, 15 Drawing Figures

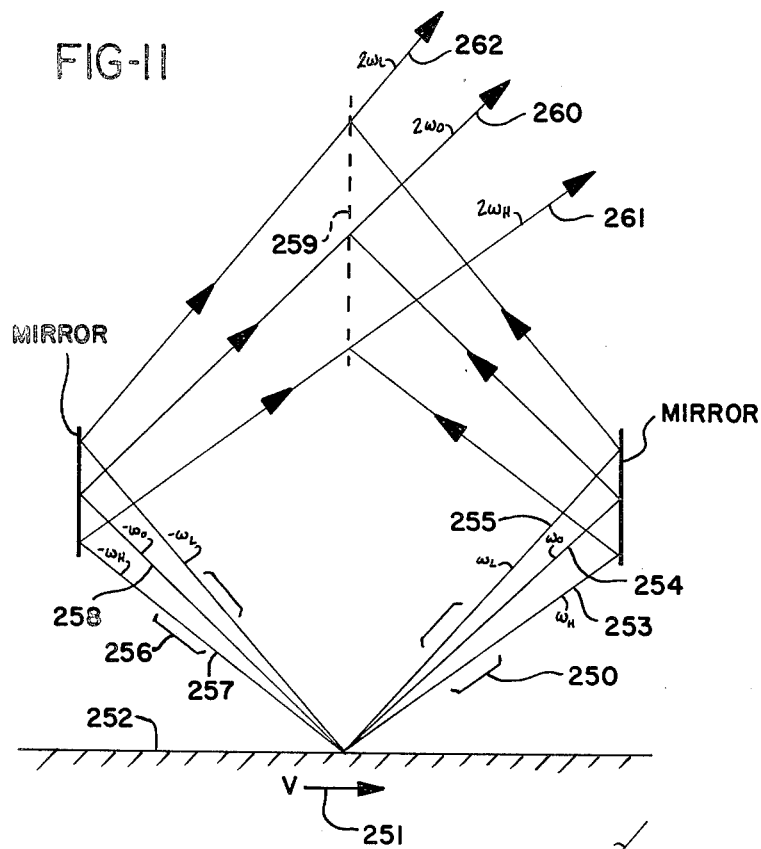
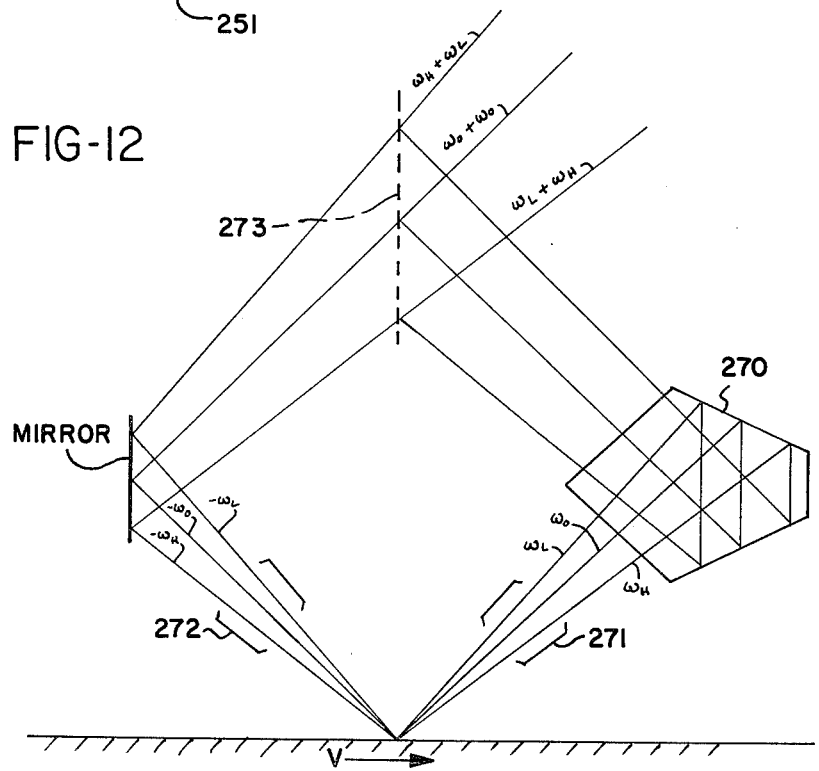

LASER DOPPLER VELOCIMETER

BACKGROUND OF THE INVENTION

The field of the invention is in the interferometer art, and more particularly, that of an interferometer-type device for measuring the velocity of a moving reflective surface through the Doppler shifts of reflected laser beams.

Velocity measuring devices utilizing reflected laser beams are known. Leslie E. Drain in his paper, "Doppler Velocimetry," in *Laser Focus* for October 1980, pages 68–73, discusses various types of laser interferometers including heterodyne, fringe crossing, and differential Doppler concepts. U.S. Pat. No. 3,432,237 entitled VELOCITY MEASURING DEVICE, to patentees Flower and Gamertsfelder, discloses a velocity measuring device utilizing the signal generated by the passing of successive reflected lobes of a laser beam by an aperture. The paper "Laser Velocimeter" published in *IEEE Conference Record of 1969 Fourth Annual Meeting of the IEEE Industry and General Applications Group*, Oct. 12–16, 1969, at pages 307–314, by R. A. Flower, and the paper "A Laser Velocimeter" by Gus Stavis, published in *TNB* Volume 8, No. 4, 1965, by GPL Division of General Precision Incorporated, further discusses velocimeters utilizing the passing of side lobes of reflected laser beams by an aperture. A commercially available laser Doppler velocimeter is described in the brochure "Laser Doppler Velocimeter" by Cambridge Physical Sciences, available through U.K. agents: Survey and General Instrument Company Ltd., Fircroft Way, Edenbridge, Kent, U.K. Further background information on optical heterodyning may be found in the paper "The Antenna Properties of Optical Heterodyne Receivers" by A. E. Siegman, published in *Proceedings of the IEEE* for October 1966, at pages 1350–1356.

SUMMARY OF THE INVENTION

The invention is for a new combination of elements providing a novel device for measuring the velocity of a surface without making any contact other than that of a laser beam directed onto the surface. Some prior art velocity measuring devices also utilize only a laser beam contacting the moving surface. Many of these sense light intensity variations as a lobed reflection pattern passes an aperture or grating. Some compare the frequency of a reflected signal with the transmitted signal.

The present invention generates a fringe pattern formed by the interference of a reflected signal having a positive Doppler shift with a reflected signal having a negative Doppler shift. The frequency of the intensity variation of the fringe pattern is a function of the velocity of the surface onto which the laser beam is directed. In prior art devices, the output indication is also a function of the angle of incidence of the laser beam onto the surface. This requires very accurate knowledge of the angle of incidence for accurate velocity measurement. The present invention does not require a highly accurate determination of the angle of incidence. Also, external mechanical stability, i.e., stability of the device relative to the surface being measured, is not critical and no longer a problem as in the prior art devices. The prior art two beam devices, frequently termed differential Doppler devices, as discussed in the previously stated references, require the two laser beams to intersect at the surface being measured to produce a region of interference at the surface. What is detected then are reflections from individual scattering centers traversing this region.

The invention utilizes homodyne operation with single frequency lasers. Either homodyne or heterodyne operation may be used with multi-mode lasers wherein two different frequency probe beams are utilized. The spread in Doppler shift with reflection angle variation is substantially eliminated by a unique system of apparatus for collapsing the frequency spread by spatially inverting either the positive or negative Doppler signals.

It is therefore an object of the invention to provide a laser velocimeter comprising a laser beam directed onto the surface of which the velocity is desired with reflections from the surface having positive Doppler shift combined with reflections having a negative Doppler shift to provide a fringe pattern having an intensity variation frequency responsive to the velocity of the surface.

It is another object of the invention to provide a system for collapsing a Doppler shift spread due to an angular spatial spread of Doppler shifted reflections.

It is another object of the invention to provide a laser Doppler velocimeter having a probe beam and reflected beams in separate paths in a common plane.

It is another object of the invention to provide a laser Doppler velocimeter that determines the sense of direction of a moving surface by injecting a tilt to single frequency systems and detecting the shift in the frequency of the reflected signal, and in two-frequency embodiments detecting the variation in magnitude between the absolute frequency of the positive Doppler shifted signal and the absolute frequency of the negative Doppler shifted signal.

Yet another object of the invention is to provide a laser Doppler velocimeter that produces a fringe pattern by heterodyning the separate reflections of two different frequency probe signals from a common multimode laser, one reflection having a positive Doppler shift, and the other reflection having a negative Doppler shift, providing a fringe pattern having an intensity variation responsive to the velocity of the surface being measured substantially independent of any overall shifting of the laser frequency.

Other objects and advantages of the invention will be apparent from the following description, the accompanying drawings, and the appended claims.

BRIEF DESCRIPTION OF THE DRAWINGS

FIG. 11 is an exaggerated schematic drawing illustrating Doppler frequency spread with beam angle;

FIG. 12 is a schematic representation of collapsing a frequency spread by placing a pentaprism in one beam;

DESCRIPTION OF THE PREFERRED EMBODIMENTS

Figure 1:
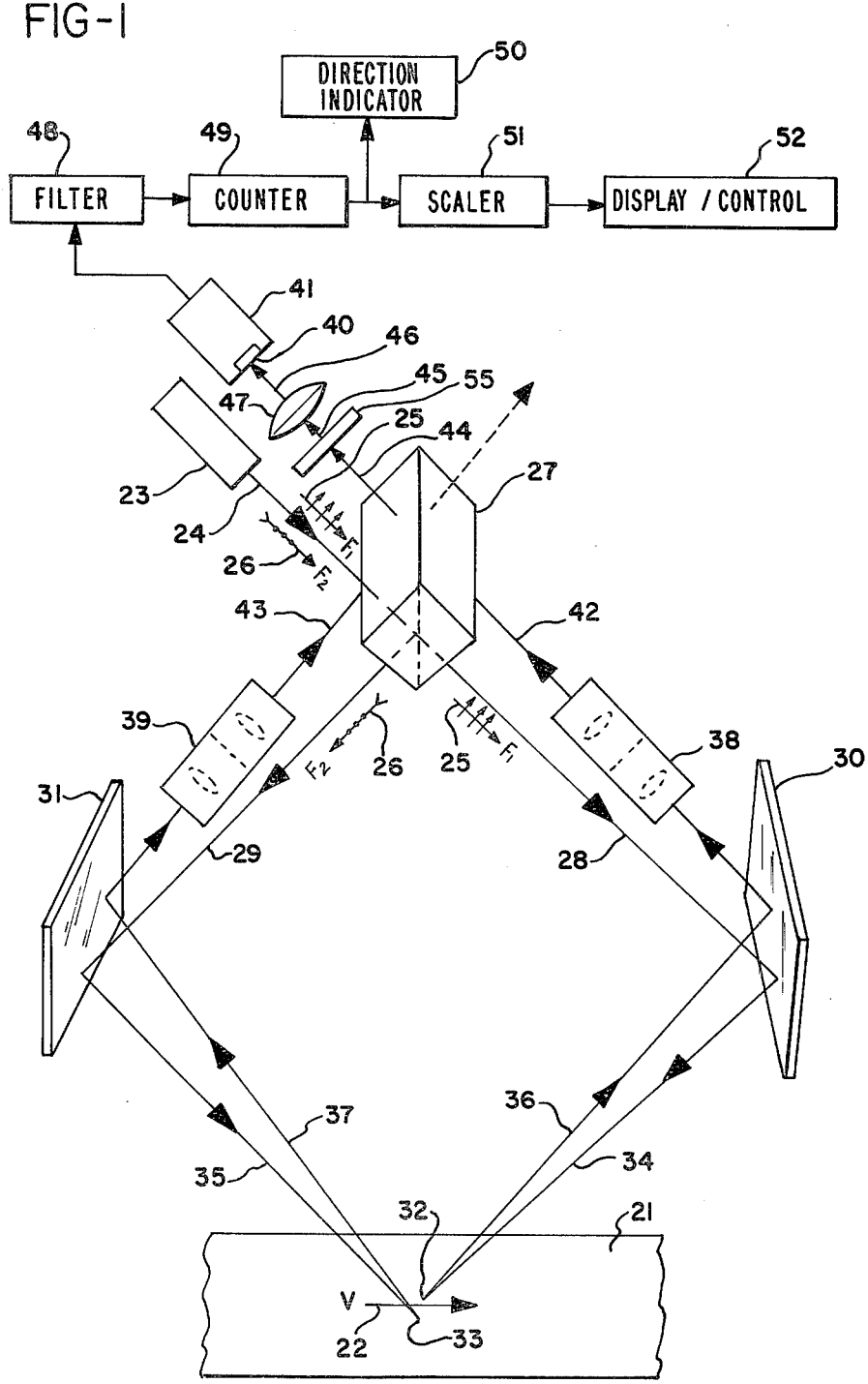
FIG. 1 is a block, pictorial, schematic drawing of a generally preferred embodiment of the invention.

Referring to FIG. 1, it is desired to measure the velocity of surface 21. The surface characteristics are not critical to the operation of the invention. The surface may be a flat sheet, or a curved wire, it may provide a specular or diffused reflection, it may be highly reflective or of relatively low reflectivity, the velocity may be relatively constant or rapidly varying, and the invention will provide an indication of the instantaneous velocity 22 and the direction of motion. Of course, the greatest usable reflections requiring the least amount of filtering and amplification are from surfaces providing an intense diffuse reflection.

Multi-mode laser 23 provides a laser beam 24 comprising a first frequency 25 and a second frequency 26 orthogonally polarized to the first. (A typical, and suitable, laser is a Helium-Neon laser having a cavity approximately 33.3 centimeters in length providing a primary mode of illumination of approximately 6328 angstroms [i.e., a wavelength of 632.8 Nanometers and a frequency of $4.74 \times 10^{14}$ Hz] and an orthogonally polarized beam having a stable intermode frequency difference of approximately 450 MHz.) Beam 24 enters a conventional polarizing beam splitter 27, such as a Spectra-Physics type 515, which effectively splits the orthogonal components of beam 24 into beam 28 having frequency and polarization 25 and beam 29 having frequency and polarization 26.

These beams 28 and 29 are reflected, respectively, by conventional, flat, adjustable mirrors 30 and 31 angled so as to cause the beams to impinge on the moving surface 21 at spot locations 32 and 33, respectively. The spot separation is not critical and separation is not a requirement, but it is generally desirable to reduce forward scatter from the probe beams 34 and 35 from entering the reflection beams. Spot separations of approximately one millimeter or slightly less are generally suitable. The direction of spot separation is not critical. In the embodiments illustrated, the separation is shown to be in a generally transverse direction to the direction of motion. The separation may just as well be longitudinal with the direction of motion, or at any other angle. The spot separation is typically made quite small relative to the other parameters involved so that direction of separation is thus inconsequential.

Reflections 36 and 37 from the probe beams 34 and 35, respectively, from a surface providing specular reflection will comprise substantially light of the same polarization as the respective probe beams. Surfaces that produce a diffused reflection will substantially be de-polarized to the extent of containing all polarizations with accordingly less intensity of light having the desired polarization. The desired paths of the reflected beams 36 and 37 are substantially, but not exactly, along the paths of the respective probe beams 34 and 35. (Other reflections not along these paths 36 and 37 are not utilized.) Conventional spatial filters 38 and 39 are adjusted to pass only the reflections from the desired respective illumination spots 32 and 33. This further aids in eliminating forward scatter from the opposing probe beam.

Figure 6:
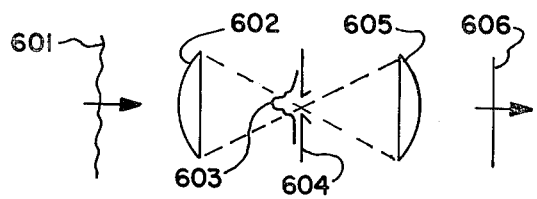
FIG. 6 is a schematic drawing illustrating a typical spatial filter.

The primary function of the spatial filters is to correct for phase distortion in the reflected wave. It is desirable that the wave front at the observation plane 40 of the photodetector 41 be smoothly varying and preferably flat. These are separate and independent parameters from the Doppler-shifted frequency of the reflected beam which is to be sensed. The operation of a typical spatial filter is schematically diagrammed in FIG. 6. Typical returning wave front 601 has been greatly distorted in phase. When this wave 601 is brought to a focus by lens 602, it will consist of a central maximum plus energy in the side lobes due to diffraction and due to the phase distortion present, as schematically illustrated 603. When an aperture stop 604 is placed at the focus of the lens and a second lens 605 is positioned behind the aperture stop a focal distance away, then a plane wave 606 with greatly reduced phase distortion will emerge. To condition laser beams in the laboratory is a typical common usage of spatial filters. A typical, and suitable, commercially available spatial filter is the Model 900 manufactured by the Newport Research Corporation, Fountain Valley, Calif.

Figure 8:
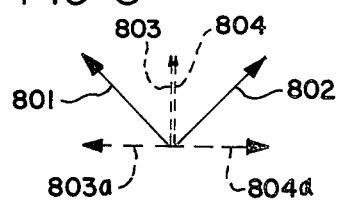
FIG. 8 is a schematic illustration showing the resolving of orthogonally polarized beams by a typical polarizer.

Spatially filtered reflected beam 42 has a major component of polarization similar to probe beam 28. This component, not being in the plane of the polarization element in the polarizing beam splitter 27, passes substantially straight through. Spatially filtered reflected beam 43 has a major component of polarization similar to probe beam 29. This component, being in the plane of the polarizing element of the polarizing beam splitter 27, is reflected so that a beam 44 emerges the polarizing beam splitter having orthogonal components of polarization. (Reflections in the return beams 42 and 43 having polarizations orthogonal to that desired are passed out of the beam splitter and are not used as indicated by the dotted arrow.) These polarization components of composite beam 44 are represented in FIG. 8 by vectors 801 and 802. A linear polarizer 55 is employed to permit the two orthogonal components, 801 and 802, comprising beam 44 to mutually interfere. This is done by resolving each component into two subcomponents 803, 803a and 804, 804a, parallel and perpendicular to the polarizer axis respectively. The parallel subcomponent 803 and 804 for each component is then passed and permitted to interfere at the detector.

In the embodiment illustrated in FIG. 1, the beam 45 has intensity amplitude variations determined by the frequency difference between the two component beams. Thus, in this particular embodiment being described in detail in which a multi-mode laser 23 having a intermode difference frequency of 450 MHz is used, the frequency of the amplitude variations of the intensity of beam 45 is 450 MHz for zero velocity 22 of the surface 21, i.e., when the surface is stationary. For surfaces moving as indicated by the velocity vector 22, reflected beam 36 has a positive Doppler frequency shift, while beam 37 acquires a negative Doppler frequency shift. For reverse directions of motion of surface 21, beam 37 acquires a positive Doppler and beam 36 a negative Doppler frequency shift. The invention combines these two beams interferometrically to provide a beam 46 focussed by lens 47 on photosensitive element 40 of detector 41. (If photodetector 41 contains a focussing lens, separate lens 47 is not needed.)

The electrical output of the conventional photodetector 41 is selectively filtered by conventional band pass filter 48, frequency counted by conventional counter 49, direction indicated by left-right direction indicator 50, appropriately scaled by conventional scaling amplifier 51, and the resultant displayed in units of length per unit of time by display 52. The electrical signal from scaler amplifier 51 may be conventionally used as a control signal in conventional circuits to actuate drive motors for regulating the surface velocity.

It is well known that positive and negative Doppler frequency shifts are not reciprocal in magnitude. That is, for example, the shift in frequency of an approaching train whistle is different in magnitude as well as sign from the perceived pitch change as the train is departing the observer (the observer being stationary and the train moving at constant velocity while emitting a steady frequency whistle). Thus, it can readily be shown that the change in frequency of the wave in reflected beam 36 is increased over that of probe beam 34 by the velocity of light plus the effective velocity component of the surface all divided by the velocity of light minus the effective velocity component of the surface, when the movement of the surface is approaching the source as shown. Expressed mathematically, the frequency of the reflected beam $f_r$ is:

$$f_r = f_p \frac{(V + v \cos \theta)}{(V - v \cos \theta)}$$

in the approaching instance, where $f_p$ is the frequency of the probe beam, V is the velocity of light and v is the velocity of the surface, and $\theta$ is the angle between the light beam and the surface in the plane of the velocity. Likewise, when the surface is receding from the beam, the reflected beam $f_r$ is:

$$f_r = f_p \frac{(V - v \cos \theta)}{(V + v \cos \theta)}$$

It can now be seen that when the two probe beams are of different frequencies, that is, i.e., $f_{p1}$ and $f_{p2}$, and the received return beams are heterodyned, that for zero velocity, 22, of the surface 21, the beat signal or frequency of the intensity variation on the photodetector 41 will be the same as the frequency of the mode separation in the laser 23. In the specific embodiment being discussed in detail, it is 450 MHz. Considering the fact that the Doppler principle decrees that the increase in frequency with closing range is greater than the decrease in frequency with opening range, other conditions being the same, and the fact that all normal velocities of surface movement that will be measured are many times removed from the velocity of light, it is apparent that, when the velocity of surface is in the direction approaching the higher frequency probe beam, that the output signal, that is, fringe intensity frequency, will be greater in frequency than the mode separation, and when the surface is receding from the higher frequency probe beam, the output signal will be less in frequency than the mode separation frequency. In the particular embodiment being described, with the beams making approximately 45° angles with the surface, the shift in frequency from 450 MHz is a little greater than 4 MHz up (higher) for a surface moving at approximately one meter per second in a direction toward the high frequency probe beam and a little less than 4 MHz down lower in frequency for a surface moving away from the higher frequency probe beam. These variations are taken into consideration in the conventional calibration of the instrument.

Figure 2:
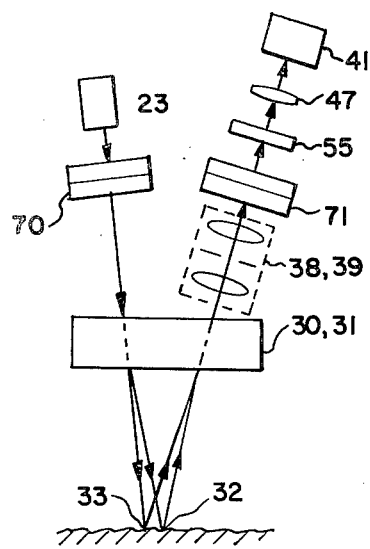
FIG. 2 is a block schematic end view, looking in the direction of movement of the moving surface of a typical embodiment.

FIG. 2 is a pictorial schematic end view of an embodiment similar to that of FIG. 1. The angular departure of the beams from the vertical plane is enlarged for clarity. Separate polarizing beam splitters 70 and 71 are shown in the probe and return receiving beams. Generally, a common beam splitting element 27 as illustrated in FIG. 1 can be used because the angle of separation of the beams generally is relatively small. When the angle between the probe beams and return beams is relatively large, it is desirable to use separate, appropriately angled polarizers as illustrated in FIG. 2. These variables of polarizer angles of acceptance are well known in the art, and those practicing the invention will adjust the configurations of the apparatus accordingly.

Figure 4:
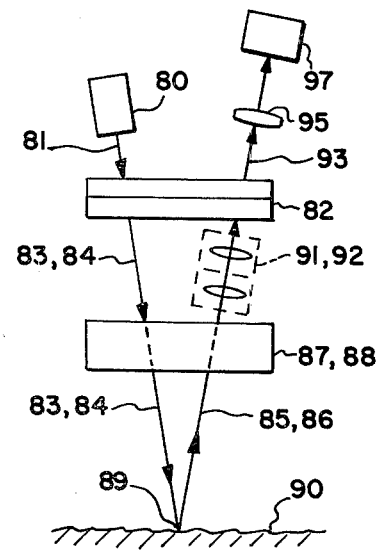
FIG. 4 is a pictorial schematic end view of the embodiment illustrated in FIG. 3.
Figure 3:
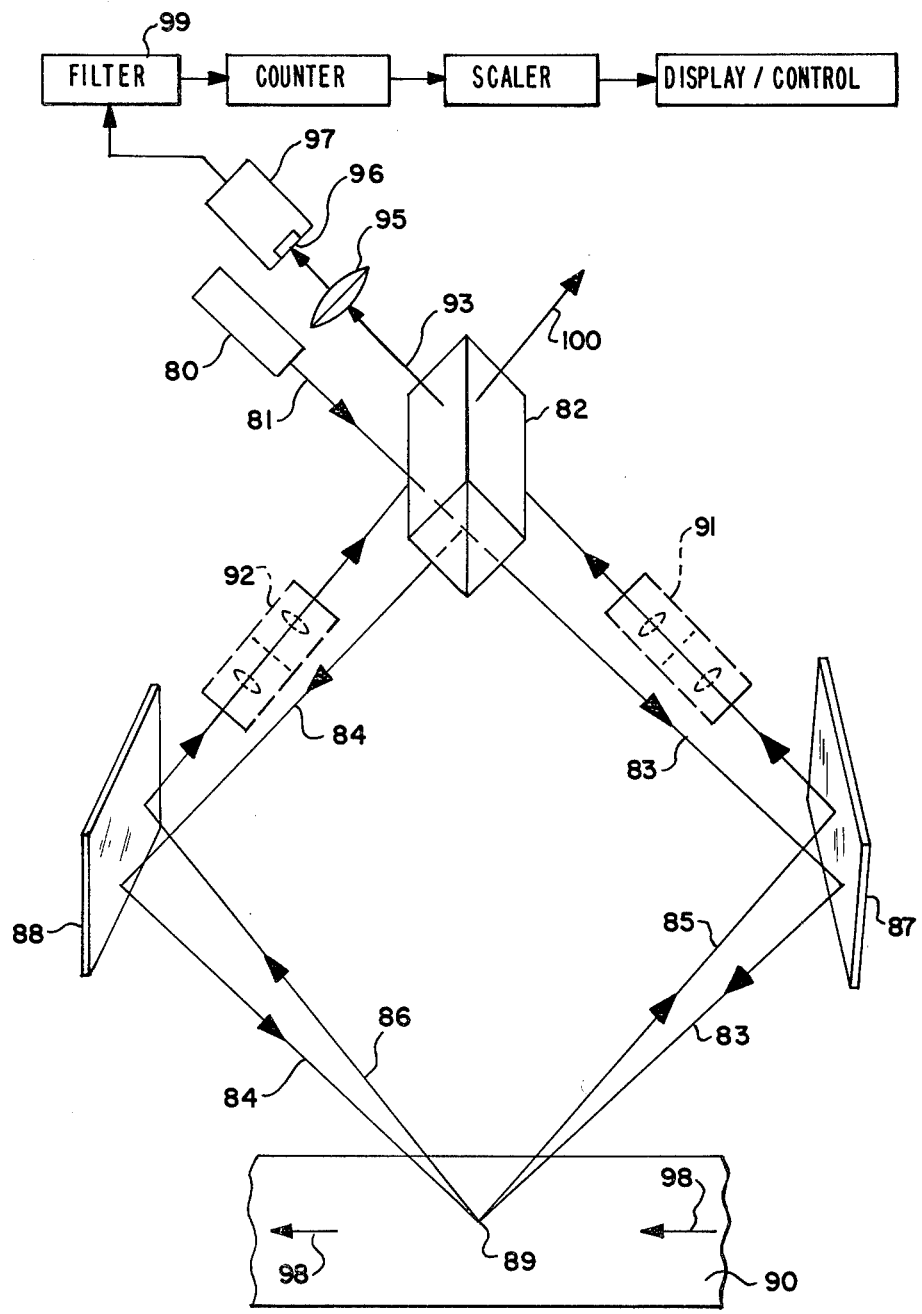
FIG. 3 is a block, pictorial, schematic drawing of another embodiment of the invention.

A somewhat similar physically, but more complex operationally, embodiment of the invention is illustrated schematically in front view in FIG. 3 and in end view in FIG. 4. In this embodiment, laser 80 is a non-polarized, single mode, i.e., single frequency, conventional laser. The beam 81 contains components in all directions. Conventional non-polarizing beam splitter 82 conventionally separates out two beams 83 and 84. These beams are of the same frequency. They are reflected by conventional adjustable flat mirrors 87 and 88 to impinge at the common point on moving surface 90. While two slightly separated points of impingement, as described in the previous embodiment, are generally preferred, some surface conditions may require that a single point be used. This embodiment, schematically illustrated in FIG. 3, may be operated either with a single point of beam impingement as illustrated in this FIG. 3 or point separation may be used. As in the previously described embodiment, point separation will provide for greatly reduced or eliminated, forward scatter from the opposing probe beam. Thus, return beam 85 will contain reflections from its respective probe beam 83. These reflections will contain a Doppler frequency shift. In addition, returning beam 85 will contain forward scatter from beam 84. These forward scattered beams from opposing probe beam 84 will not contain any Doppler shift. These same conditions apply to return beam 86 with respect to probe beams 84 and 83.

Return beams 85 and 86 are phase corrected by spatial filters 91 and 92, respectively. The action of these filters has been described. Beam halves passed out of beam splitter 82 along path 100 are not used. Thus, there are effectively four beam components in composite beam 93. One component is the reflection of probe beam 83 having a Doppler frequency shift in accord with the movement of surface 90, another is the forward scatter from probe beam 84. This component has no Doppler frequency shift. Another component is the return reflection from probe beam 84 having a Doppler shift; and the fourth component is the forward scatter from probe beam 83 and having no Doppler shift. As in the previous embodiment, lens 95 focusses the beam onto observation plane 96 of photodetector 97.

The operation of the previous embodiment employing two separate frequencies beating or combining to produce a difference frequency is termed heterodyne. This (FIG. 3) embodiment having only one frequency plus the Doppler shifts, operates on the homodyne principle. Thus, the frequency of amplitude variations of the fringe pattern formed on the observation plane 96 produced by the beating of Doppler shifted return beams are a direct measure of the velocity 98 of the moving surface 90. Unlike the previous embodiment, for relatively low velocities of the moving surfaces, the beat signal approaches zero. It can thus be seen that for very low frequencies, homodyning of the Doppler frequency shifted return beams tends to become unsatisfactory from a detection standpoint.

Figure 7:
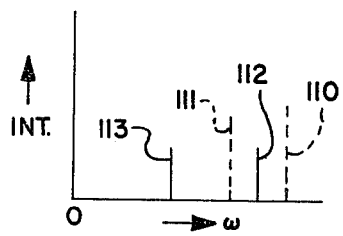
FIG. 7 is an illustrative frequency spectrum plot of a typical frequency distribution.

Other beat signals are present due to the forward scatter beams having no Doppler shift being present in the beam passed to the detector. Thus, there are the beat signals formed from the combination of the original laser frequency (forward scatter signals) with each of the Doppler shifted signals, i.e., the signal having a positive Doppler and the signal having a negative Doppler frequency shift. The frequency of the intensity variations of all of these beat signals approach zero as the velocity of the surface being measured approaches zero. Relatively narrow pass-band filter 99 is set to encompass the desired operating frequency range of the received signals. This is illustrated graphically in FIG. 7 wherein the filter pass-band has high frequency cut-off 110 and low frequency cut-off 111. Beat signal 112 from the Doppler shifts of two probe beams representing the surface velocity is maintained within the filter range by conventional feedback control circuitry. The beat signal 113 from one Doppler shift and the original probe frequency is outside this pass-band. Directivity of motion with this embodiment may be obtained as later described.

Figure 5:
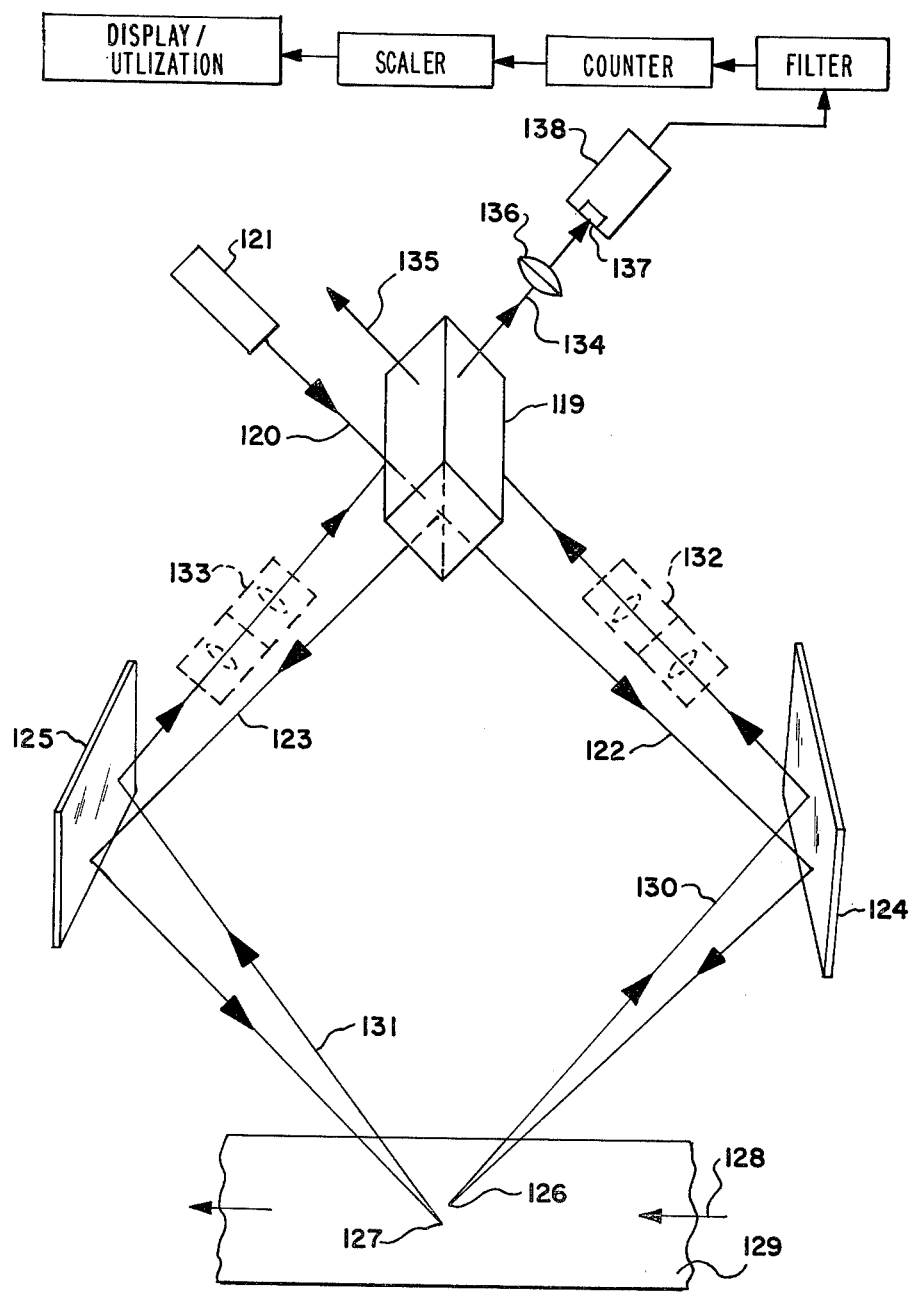
FIG. 5 is a block, pictorial, schematic drawing of another embodiment of the invention.

The use of beam polarization aids in separation of the desired return beam as does a slight separation in the impingement spots of the two probe beams. This separation is desirable in that undesirable signals and noise are reduced thus making the detection of the desired signal easier. An embodiment using only a single spot has been described and shown in FIGS. 3 and 4. FIG. 5 illustrates schematically an embodiment utilizing non-polarizing beams but with slightly separated points of probe beam impingement. The beam 120 from conventional laser 121 is split into two beams 122 and 123 by conventional beam splitter 119. As in the embodiment illustrated in FIG. 1, flat mirrors 124 and 125 are adjusted to direct these beams to slightly separated spots 126 and 127, respectively. The reflections of each of these beams are Doppler shifted by the movement 128 of surface 129. In the illustration of FIG. 5, return beam 130 is lower in frequency in the conventional Doppler manner, and beam 131 is raised in frequency. These return beams are spatially filtered by filters 132 and 133 and combined by beam splitter 119 into substantially identical beams 134 and 135. Beam 135 is not used in the embodiment illustrated. Lens 136 focusses beam 134 onto the photosensitive element 137 of photodetector 138. The beat signal associated with beam 134 is formed by homodyne action and with zero velocity will produce a zero beat signal.

An embodiment as otherwise illustrated in FIG. 5 but having a multi-mode laser 121 will provide both homodyne and heterodyne operation. The multiplicity of beats produced provides a wide range of control frequencies.

Figure 9:
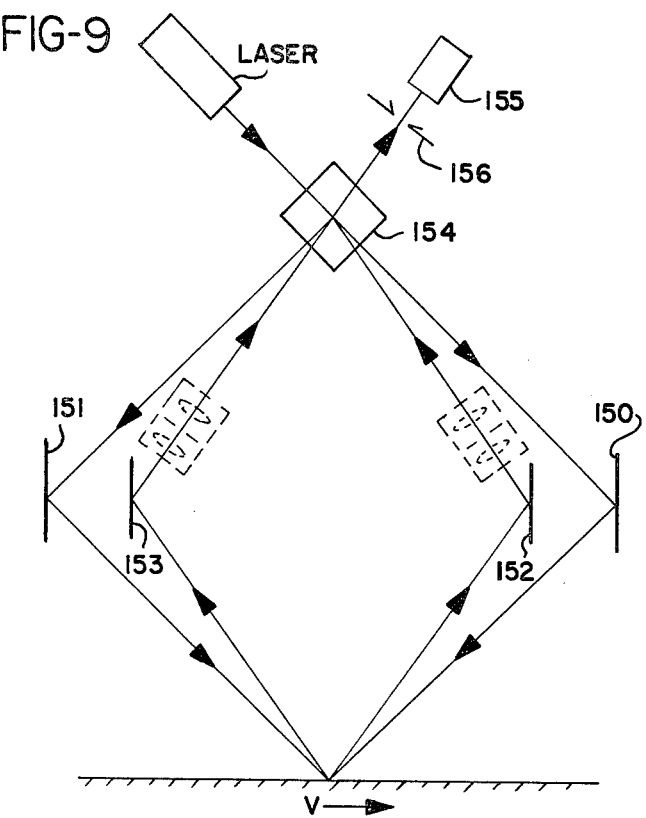
FIG. 9 is a partial schematic drawing illustrating an embodiment having probe beams and receive beams in the same plane.

In the embodiments previously described, the return beam paths have been angled slightly with respect to the probe beam to prevent back scatter from the probe beam from masking the reception of the return beams. That is, the paths of the probe beam and the return beams have not been in the same plane. This is clearly shown in the views of FIGS. 2 and 4 in addition to the other illustrations. FIG. 9 schematically illustrates an embodiment in which the probe beams and the return beams are in the same plane yet separate beam paths are maintained. In this embodiment, separate mirrors 150 and 151 are used for the probe beams from those 152 and 153 used for the return receive beams. Beam splitter 154 functions in a conventional manner as previously described, splitting the laser beam into two beams and combining two return beams into a single beam. Detector 155 contains a focussing lens, as previously described. Aperture stop 156 is used to exclude stray light intensities. Such a stop may also be used when desired with the previously described embodiments. This single plane configuration may be used with all of the previously described dual probe beam embodiments.

From the foregoing descriptions, it is apparent that a plurality of dual probe beam laser velocimeters may be constructed of varying complexity and operational characteristics. For instance, in the two frequency types providing heterodyne operation, all combinations of polarized and non-polarized, one or two spot combinations may be utilized. Likewise, in the single frequency types, the same combinations are available. Also, while generally not as convenient in the two plane embodiments, separate mirrors may be used for a probe beam and for its reflected beam.

Figure 10:
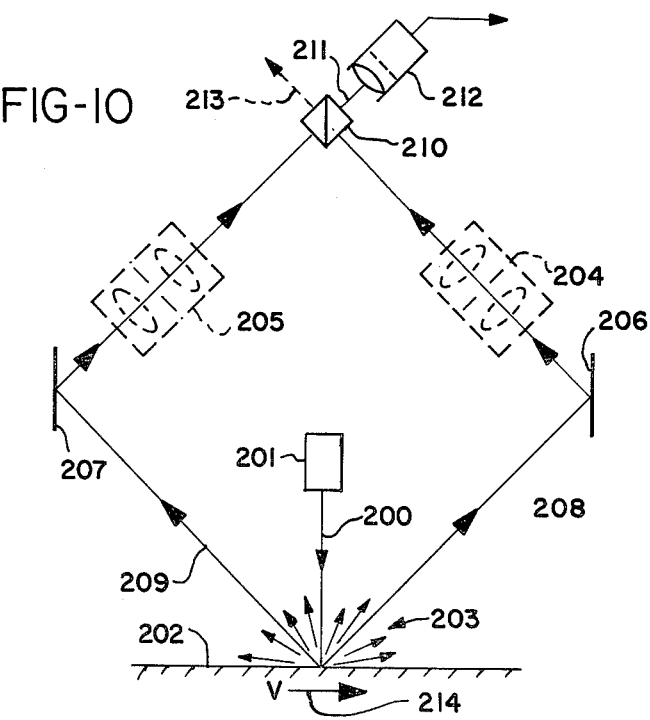
FIG. 10 is a pictorial schematic drawing of an embodiment having a single laser probe beam.

The invention is not restricted to dual probe beams. FIG. 10 schematically illustrates an embodiment wherein a single probe beam 200 from conventional single frequency laser 201 impinges substantially perpendicularly upon surface 202 providing relatively intense scattered radiation 203. Spatial filters 204 and 205 cooperate with flat mirrors 206 and 207 to select and direct reflected beams 208 and 209, respectively, upon the beam splitting surface element in beam splitter 210, which in this instance functions to combine beams rather than to divide them. Beam 211, combined from spatially filtered beams 208 and 209, produces a modulated intensity on the photodetector 212. (Half the combined beam energy 213 passes out the other surface of the beam splitter unused.) In this embodiment, it is to be noted that, unlike the foregoing described embodiments, there is no Doppler effect applied to the probe beam; only the reflected beams have a Doppler frequency shift. For surface 202 moving in the direction 214, the frequency of reflected beam 208 is increased in accordance with the expression $$f_r = f_p \frac{(V)}{(V - v \cos \theta)}$$

where $f_r$ is the frequency of the reflected beam 208, $f_p$ is the frequency of probe beam 200, V is the velocity of light, v is the velocity 214 of surface 202, and $\theta$ is the angle between the direction of motion of the surface in the plane of the reflected beam (normally 45°). Likewise, the frequency of reflected beam 209 is lowered as indicated by the expression $$f_r = f_p \frac{(V)}{(V + v \cos \theta)}.$$

The reflections from an impinging probe beam, whether the probe beam be perpendicular as illustrated in FIG. 10, or at an angle with a surface as in other embodiments, will be scattered as indicated at 203 in FIG. 10. The degree of Doppler frequency shift possessed by the reflected beams is a function of their angle with the surface as previously set forth. Considering only the reflected beam, and greatly overemphasizing the spread of the beams utilized, the situation is obtained as illustrated in FIG. 11. FIG. 11 is not only applicable to the embodiment illustrated in FIG. 10, but also to the reflected beams of all other embodiments. Previously, in discussing the operation of embodiments of the invention, return reflections have been spoken of as a single beam while actually the reflection is a spread of illumination within the acceptance limits of the elements utilized. This spread is illustrated, overemphasized, in FIG. 11. Considering 254 as the median beam with median Doppler shift $\omega_o$, the beam on which operation of the device is based, it is readily apparent that the beam set 250 having positive Doppler shift (for direction of movement 251 of surface 252), that the lower beam 253 will have a greater positive Doppler shift than the median beam 254, and the beam 255 will have less positive Doppler shift that the median beam. The same situation holds for the set of beams 256 having negative Doppler shift, i.e., beam 257 will be decreased more in frequency than median beam 258. When these two sets of return beams are combined in the beam splitter 259 (acting as a beam combiner), it can be seen that beam 253 having the greatest positive Doppler shift is combined with beam 257 having the greatest negative Doppler shift. Likewise, the beam having the least positive Doppler shift is combined with the beam having the least negative Doppler shift. Thus, the magnitude of Doppler shift is greater in beam 261, and less in beam 262 than the desired Doppler shift of beam 260. This may frequently become appreciable and act to greatly degrade the operational performance of the invention.

A unique way to correct this discrepancy in the reflected beam Doppler shift magnitudes has been devised. The frequency may be collasped by optically inverting the ordering of the beams so as to make the resultant differential Doppler shift from all the combined beams to have the same value as that of the median beam. This is accomplished by recognizing that with equal spread to a first approximation $\omega_H + \omega_L = 2\omega_o$. One embodiment for doing this has been a pentaprism inserted in one set of reflected beams (either set) so as to effectively invert the high and low value Doppler shift beams of that set. This is schematically illustrated in FIG. 12. (For clarity, details of the system not involved with frequency collapsing are omitted in FIG. 12.) Conventional pentaprism 270 inverts the beam set 271 such that, when the respective beam elements of this set are combined with beam set 272 by combining beam splitter 273, the resultant Doppler values of all beams are substantially the same value. Thus, by this process, the frequency spread has been collasped to a small value. It is to be noted that, for practical usage, the foregoing statement is correct, however, due to the non-linearity of the cosine function and the fact that the positive and negative Doppler shifts are not identical, a small discrepancy still exists. This is a second order effect and for practical purposes may be ignored.

Figure 13:
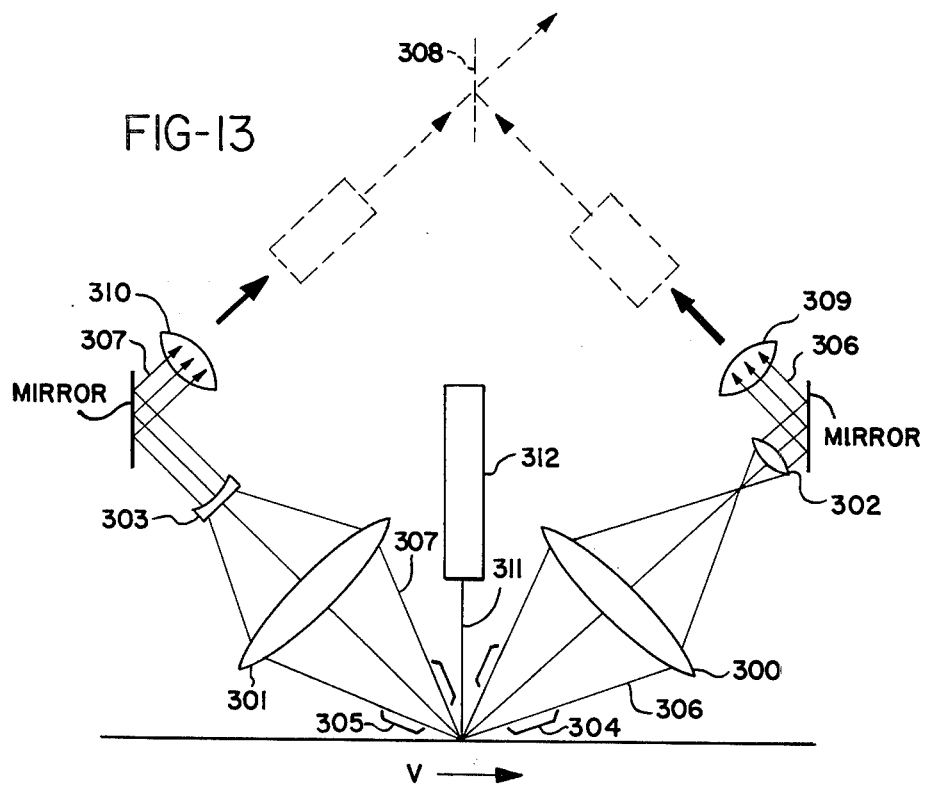
FIG. 13 is a schematic representation of collapsing a frequency spread with a positive lens in one leg and a negative lens in another leg of the reflected beams.

Another embodiment for providing frequency collasping is illustrated schematically in FIG. 13. In this embodiment of a Doppler frequency shift collasping system, a pair of objective lenses 300 and 301 cooperate, respectively, with positive lens 302 and negative lens 303 to effectively invert the spread of Doppler containing beam elements in beam set 304 with respect to the Doppler containing elements in beam set 305. Thus, as illustrated, beam element 306 having the greatest positive Doppler shift is combined in beam combiner 308 with beam 307 having the least negative Doppler shift. Again, it should be pointed out that the spread has been greatly overemphasized in the drawing and that the optical energy 309 is generally referred to in the singular as a beam. Likewise, the optical energy 310 containing a spread of Doppler frequency shifts is commonly referred to as a single beam.

In the embodiment diagrammed schematically in FIG. 13, a single probe beam 311 from laser 312 is shown as an example of an embodiment similar to the single beam laser velocimeter illustrated in FIG. 10. The embodiment of frequency collasping illustrated in FIG. 13 is not limited to single probe beam devices but is also equally applicable to dual probe beam embodiments.

Figure 15:
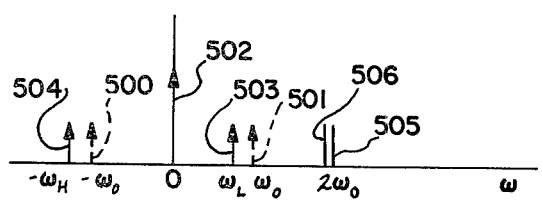
FIG. 15 illustrates the frequency spectrum change by the tilt illustrated in FIG. 14.
Figure 14:
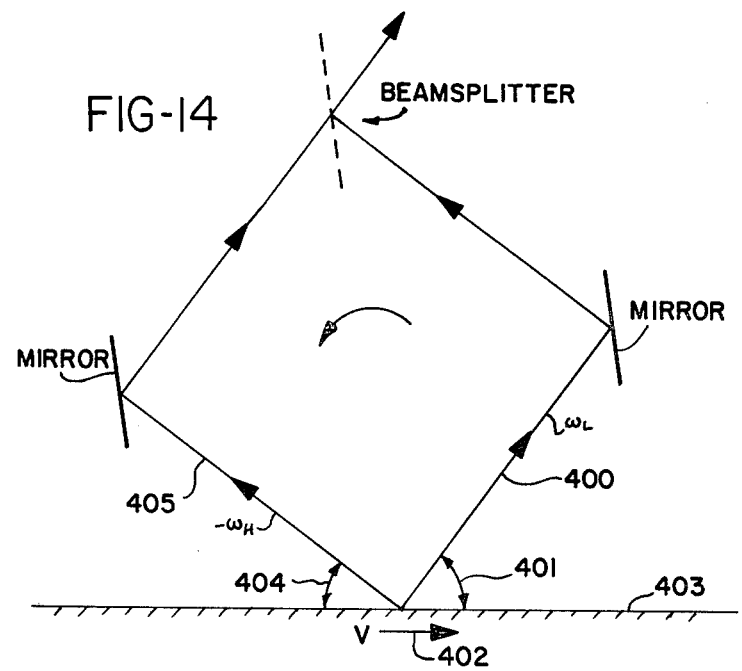
FIG. 14 is a schematic representation illustrating the obtaining of the direction of the moving surface by altering the angles of impingement and reflection of the laser beam on a moving surface.

The embodiments of the invention using two separate frequency probe beams provide direction indication as previously described. The single frequency embodiment, whether dual probe beam or single probe beam, operating by homodyne beating, does not in itself, as previously described, provide a direction indication of the moving surface. However, directivity of motion can be ascertained in the homodyne embodiments by deliberate introduction of an asymmetry into the system as schematically illustrated in FIG. 14. Recall that homodyne embodiments will generally produce four unique beat terms. The zero frequency term due to beats between the forward scatter - forward scattered beams, two singly Doppler shifted terms due to beating between forward and backward scattered beams and the doubly Doppler shifted term due to beating between both backward scattered beams. Introduction of an asymmetry in the velocimeter such as by rotating the entire velocimeter from vertical in the plane of the velocity, 402, will produce a measurable difference in the frequency spectrum as is illustrated in FIG. 15. In dual probe beam embodiments, both probe beams and the return beams are generally rotated slightly. It is not necessary that both probe and return beams be rotated, either set is sufficient to provide an indication. However, the greatest indication is obtained when both are rotated. In the single beam embodiments as illustrated in FIG. 13, generally just the reflected beams are rotated.

Referring to FIGS. 14 and 15, with the structure in its normal operating position with reflected beam 400 making angle 401 with direction of motion 402 of surface 403, equal to angle 404 of reflected beam 405, Doppler shift frequencies 500 and 501, due to beating between the backward scattered Doppler shifted probe beams and the forward scattered probe beams containing no Doppler shift are substantially equally spread from the zero beat frequency 502, as illustrated in FIG. 15. When the structure is tilted as illustrated in FIG. 14 (i.e., decreasing the receding angle 401), this lowers the magnitude of the positive Doppler shifted beam 400 and increases the magnitude of the negative Doppler shifted beam 405, and the absolute (as opposed to differential) Doppler frequencies 503 and 504 are obtained as illustrated in FIG. 15. Had the velocity 402 been in the opposite direction, returns 503 and 504 would have been to the right of the returns 501 and 500, respectively. This movement in frequency of the Doppler returns can be conventionally detected by conventional frequency measurement and used to provide an indication of the direction of motion of the surface. Optical blanking of one beam while measuring the other may be employed.

Beating by homodyne action to two return beams provides a fringe pattern having an amplitude variation of substantially twice the Doppler frequency shift of each reflected beam as indicated at 505 in FIG. 15. However, as previously pointed out, the positive Doppler shift is not quite the same magnitude as the negative Doppler shift, thus frequency 501 is slightly further from the zero beat 502 than frequency 500 is from zero beat 502, and as the system is tilted, the positive Doppler frequency shift swings over a greater magnitude of change than the negative Doppler frequency shift. Thus, when rotating the system in such a direction that the homodyne beat signal 505 is decreased in frequency, such as to the frequency 506, it indicates that the system has been tilted toward the direction from which the surface is coming as indicated by FIGS. 14 and 15. Had the homodyne beat signal increased in frequency with the tilt, it would have indicated the system was rotated in the direction of motion. Also since the magnitude of change in the cosine function increases in magnitude with increasing increments of angle, the magnitude of frequency shift is further enhanced. Thus, through these combined effets if, by rotating the system clockwise, the beat frequency tends to increase, the direction of motion is in that direction, i.e., to the right.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A laser Doppler velocimeter for measuring the velocity of a moving reflective surface comprising:
   a. a laser providing a coherent beam of light radiation;
   b. means for directing said laser beam onto said moving surface providing a first reflection having a positive Doppler shift and a second reflection having a negative Doppler shift;
   c. means for spatially filtering said first reflection;
   d. means for spatially filtering said second reflection;
   e. means for combining said filtered first reflection and said filtered second reflection providing a fringe pattern of varying intensity; and
   f. means for detecting said variation in intensity and providing a corresponding output signal whereby said output signal is responsive to velocity of said moving surface.

2. A laser Doppler velocimeter as claimed in claim 1 wherein said means for directing said laser beam includes means for dividing said beam into a first probe beam directed at a first angle to the direction of motion of the moving surface and a second probe beam directed at a second angle to the direction of motion of the moving surface.

3. A laser Doppler velocimeter as claimed in claim 1 wherein said means for directing said laser beam includes means for directing said laser beam substantially perpendicularly to said moving reflective surface.

4. A laser Doppler velocimeter as claimed in claim 3 wherein said means for combining said first reflection and said second reflection includes means for optically inverting one with respect to the other of said first reflection and said second reflection.

5. A laser Doppler velocimeter as claimed in claim 2 wherein said first probe beam and said second probe beam are positioned in a first plane substantially parallel to said velocity and said first reflection and said second reflection are positioned in a second plane substantially parallel to said velocity.

6. A laser Doppler velocimeter as claimed in claim 2 wherein said first probe beam, said second probe beam, said first reflection, and said second reflection are all substantially in a common plane substantially parallel to said velocity.

7. A laser Doppler velocimeter as claimed in claim 5 wherein said means for combining said first reflection and said second reflection includes means for optically inverting one said reflection with respect to the other said reflection.

8. A laser Doppler velocimeter as claimed in claim 7 wherein said laser is a multi-mode laser providing coherent radiation having a first radiation frequency and a second radiation frequency.

9. A laser Doppler velocimeter as claimed in claim 8 wherein said first frequency of radiation and said second frequency of radiation are each polarized and said polarization of said first is orthogonal with respect to said second.

10. A laser Doppler velocimeter for measuring the velocity of a moving reflective surface comprising:
    a. a laser providing a coherent beam of light radiation;
    b. means cooperating with said coherent beam of radiation for providing a first polarized beam of coherent radiation and a second polarized beam of coherent radiation having polarization substantially orthogonal to said first beam of polarization;
    c. means for directing said first polarized beam onto said moving surface providing a Doppler frequency shifted first reflected beam from said moving surface;
    d. means for directing said second polarized beam onto said moving surface providing a Doppler frequency shifted second reflected beam from said moving surface;
    e. means for spatially filtering said first reflected beam;
    f. means for spatially filtering said second reflected beam;
    g. means for combining said filtered reflected first beam and said filtered reflected second beam and providing a signal of varying light intensity; and
    h. means for detecting a frequency of variation of said varying light intensity and providing an output signal responsive thereto whereby said output signal a function of the velocity of said moving surface.

11. A velocity detector for measuring the velocity of a reflective moving surface comprising:
    a. a source of coherent radiation;
    b. means for dividing said source of coherent radiation into a first beam and a second beam;

c. means for directing said first beam onto said moving surface providing a first reflected beam;
d. means for directing said second beam onto said moving surface providing a second reflected beam;
e. means for spatially filtering said first reflected beam;
f. means for spatially filtering said second reflected beam;
g. means for combining in interferometric relationship said first and said second filtered reflected beams whereby a fringe pattern is provided having an intensity variation frequency; and
h. means for detecting a variation frequency of said varying intensity fringe pattern and providing a signal responsive to said velocity of said moving surface.

12. The velocity detector of claim 11 wherein said means for detecting an intensity variation frequency of said fringe pattern includes means for detecting homodyne signal frequency variation.

13. The velocity detector of claim 11 wherein said means for detecting an intensity variation frequency of said fringe pattern includes means for detecting a heterodyne signal frequency variation.

14. A Doppler velocimeter for measuring the velocity of a moving reflective material comprising:
a. a source of coherent light;
b. means cooperating with said coherent light source for providing a first plane polarized beam of light and having a determined plane of polarization;
c. means cooperating with said coherent light source for providing a second plane polarized beam of light and having a plane of polarization orthogonal to said first polarization of said first beam;
d. means for directing said first polarized beam onto said reflective moving material providing a first Doppler frequency shifted reflected beam;
e. means for directing said second polarized beam onto said reflective moving material providing a second Doppler frequency shifted reflected beam;
f. means for spatially filtering said first reflected beam;
g. means for spatially filtering said second reflected beam;
h. means including a linear polarizer for combining said first and said second reflected beams providing a fringe pattern having an intensity variation frequency; and
i. means for detecting the intensity variation frequency of said fringe pattern and providing an output signal responsive thereto whereby said output signal is a measure of said velocity of said moving material.

15. The velocimeter as claimed in claim 14 wherein said means for detecting the intensity variation of said fringe pattern and providing an output signal includes a frequency selective filter.

16. A laser Doppler velocimeter for measuring the velocity of a reflective moving material comprising:
a. a laser providing a coherent beam of light;
b. a first polarizing beam splitter cooperating with said coherent beam of light providing a first plane polarized coherent light beam and a second plane polarized coherent light beam having polarization orthogonal to polarization of said first beam;
c. means for directing said first plane polarized light beam onto a first predetermined location on said moving material at a first predetermined vectorial angle of impingement substantially in a plane containing the direction of motion of said material, said first vectorial angle of impingement having a directional component substantially in the direction of motion of said material, providing a first reflected beam;
d. means for directing said second plane polarized light beam onto a second predetermined location on said moving material at a second predetermined vectorial angle of impingement substantially in a plane containing the direction of motion of said material, said second vectorial angle of impingement having a directional component substantially opposite the direction of motion of said material, providing a second reflected beam;
e. a first spatial filter having an optical axis positioned to receive along said optical axis said first reflected beam and providing a first phase corrected reflected beam;
f. a second spatial filter having an optical axis positioned to receive along said optical axis said second reflected beam and providing a second phase corrected reflected beam;
g. a second polarizing beam splitter cooperating with said first phase corrected reflected beam and said second phase corrected reflected beam, combining said phase corrected reflected beams along a common path;
h. a linear polarizer cooperating with said combined beams providing a resolved beam;
i. a light detector having an observation plane providing an electrical output responsive to frequency in light intensity variations on said observation plane; and
j. means cooperating with said resolved beam providing a light image on said observation plane whereby said electrical output of said light detector is responsive to the velocity of said moving material.

17. In a Doppler detection system wherein Doppler reflections contain a spatial spread of positive Doppler frequencies having a frequency spread from a high positive value Doppler to a low positive value Doppler and a spatial spread of substantially a corresponding negative Doppler frequency having a frequency spread from a high negative Doppler value to a low negative Doppler value, the method of collapsing said frequency spread of positive Doppler frequencies and said frequency spread of negative Doppler frequencies and providing substantially a single Doppler frequency comprising:
a. inverting one of the said spatial spreads of frequencies with respect to the other said spatial spread; and
b. combining said inverted spread with other spread wherein said low values and high values of one spread are combined with said high values and said low values respectively of the other spread providing a signal having a single value Doppler.

18. The improvement in a system for indicating the relative velocity of a moving object, said system having a source of radiation of a determined frequency signal and means for detecting a magnitude of frequency change of a received signal from said determined frequency signal comprising:
a. means for directing said determined frequency signal onto said object and providing a first spatial set of signals having positive Doppler frequency shifts from a relatively high value Doppler shift to a relatively low value Doppler shift and a second spatial set of signals having substantially corresponding negative Doppler frequency shifts;
b. means for spatially inverting one set of said sets of signals; and
c. means for combining said inverted set of signals with the other set of signals whereby the frequency spread of said positive and of said negative valued Doppler signals collapses to provide a single signal with a single Doppler frequency.

19. The improvement of claim 18 wherein said means for spatially inverting said one set of signals includes a pentaprism.

20. The improvement of claim 18 wherein said means for spatially inverting one set of said signals with respect to the other includes a positive lens cooperating with one set of signals and a negative lens cooperating with the other set of signals.

21. A laser Doppler velocimeter for measuring the velocity of a reflective moving material comprising:
a. a multi-mode laser providing a beam of light having a polarized, coherent, first frequency and a polarized, coherent, second frequency, the polarization of said second frequency being orthogonal to the polarization of said first frequency;
b. a polarizing beam splitter cooperating with said beam of light providing a first plane polarized coherent light beam and a separate second plane polarized coherent light beam having polarization orthogonal to polarization of said first beam;
c. means for directing said first plane polarized light beam onto a first predetermined location on said moving material at a first predetermined vectorial angle of impingement substantially in a plane containing the direction of motion of said material, said first vectorial angle of impingement having a directional component substantially in the direction of motion of said material, providing a first reflected beam;
d. means for directing said second plane polarized light beam onto a second predetermined location on said moving material at a second predetermined vectorial angle of impingement substantially in a plane containing the direction of motion of said material, said second vectorial angle of impingement having a directional component substantially opposite the direction of motion of said material, providing a second reflected beam;
e. a first spatial filter having an optical axis positioned to receive along said optical axis said first reflected beam and providing a first phase corrected reflected beam;
f. a second spatial filter having an optical axis positioned to receive along said optical axis said second reflected beam and providing a second phase corrected reflected beam;
g. means including a polarizing beam splitter cooperating with said first phase corrected reflected beam and said second phase corrected reflected beam for combining said phase corrected reflected beams along a common path;
h. a linear polarizer cooperating with said combined beams providing a resolved beam;
i. means including a light detector having an observation plane for providing an electrical output responsive to changes in light intensity on said observation plane; and
j. means cooperating with said resolved beam providing a light image on said observation plane whereby said electrical output of said light detector is responsive to the velocity of said moving material.

22. A laser Doppler velocimeter according to claim 14 wherein said means for providing an electrical output includes an electrical filter.

* * * * *